(12) United States Patent
Salter et al.

(10) Patent No.: US 10,501,016 B2
(45) Date of Patent: Dec. 10, 2019

(54) FOLDABLE SIDE MIRROR AND METHOD OF USING THE SAME

(71) Applicant: Ford Global Technologies, LLC, Dearborn, MI (US)

(72) Inventors: Stuart C. Salter, White Lake, MI (US); Paul Kenneth Dellock, Northville, MI (US); Keith Hoelscher, Northville, MI (US); Erick Michael Lavoie, Dearborn, MI (US); Pietro Buttolo, Dearborn Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/790,358

(22) Filed: Oct. 23, 2017

(65) Prior Publication Data

US 2019/0118715 A1    Apr. 25, 2019

(51) Int. Cl.

| B60R 22/00 | (2006.01) |
| E05F 15/00 | (2015.01) |
| G05D 1/00 | (2006.01) |
| G05D 3/00 | (2006.01) |
| G06F 7/00 | (2006.01) |
| G06F 17/00 | (2019.01) |
| B60R 1/072 | (2006.01) |
| B60R 1/074 | (2006.01) |
| G02B 5/08 | (2006.01) |
| G02B 7/18 | (2006.01) |

(52) U.S. Cl.
CPC .............. *B60R 1/072* (2013.01); *B60R 1/074* (2013.01)

(58) Field of Classification Search
CPC ......... B60R 1/072; B60R 1/074; B60R 1/078; B60R 1/0612; B60R 1/07; G05G 9/047
USPC ............................................. 701/49; 359/841
See application file for complete search history.

(56) References Cited

U.S. PATENT DOCUMENTS

| 4,311,362 A | 1/1982 | LaPorte |
| 5,896,197 A | 4/1999 | Coffin |
| 8,285,457 B1* | 10/2012 | Askew ................. B60R 1/0612 |
| | | 359/841 |
| 9,205,778 B2 | 12/2015 | Henderson et al. |
| 2008/0062543 A1* | 3/2008 | Foote ..................... B60R 1/072 |
| | | 359/841 |
| 2016/0288714 A1* | 10/2016 | Fuji ........................ B60R 1/072 |
| 2017/0080864 A1* | 3/2017 | Schwartz ............... B60R 1/074 |

FOREIGN PATENT DOCUMENTS

| DE | 102012010500 A1 | 11/2013 |
| JP | 5316050 B2 | 10/2013 |

* cited by examiner

*Primary Examiner* — Mahmoud S Ismail
(74) *Attorney, Agent, or Firm* — Vichit Chea; Carlson, Gaskey & Olds, P.C.

(57) ABSTRACT

A motor vehicle according to an exemplary aspect of the present disclosure includes, among other things, a side mirror assembly having a mirror housing and a mirror. The mirror housing is moveable between a normal position and a partially-folded position, and the mirror is moveable relative to the mirror housing such that a line of sight remains the same in the normal and partially-folded positions. A method is also disclosed.

19 Claims, 4 Drawing Sheets

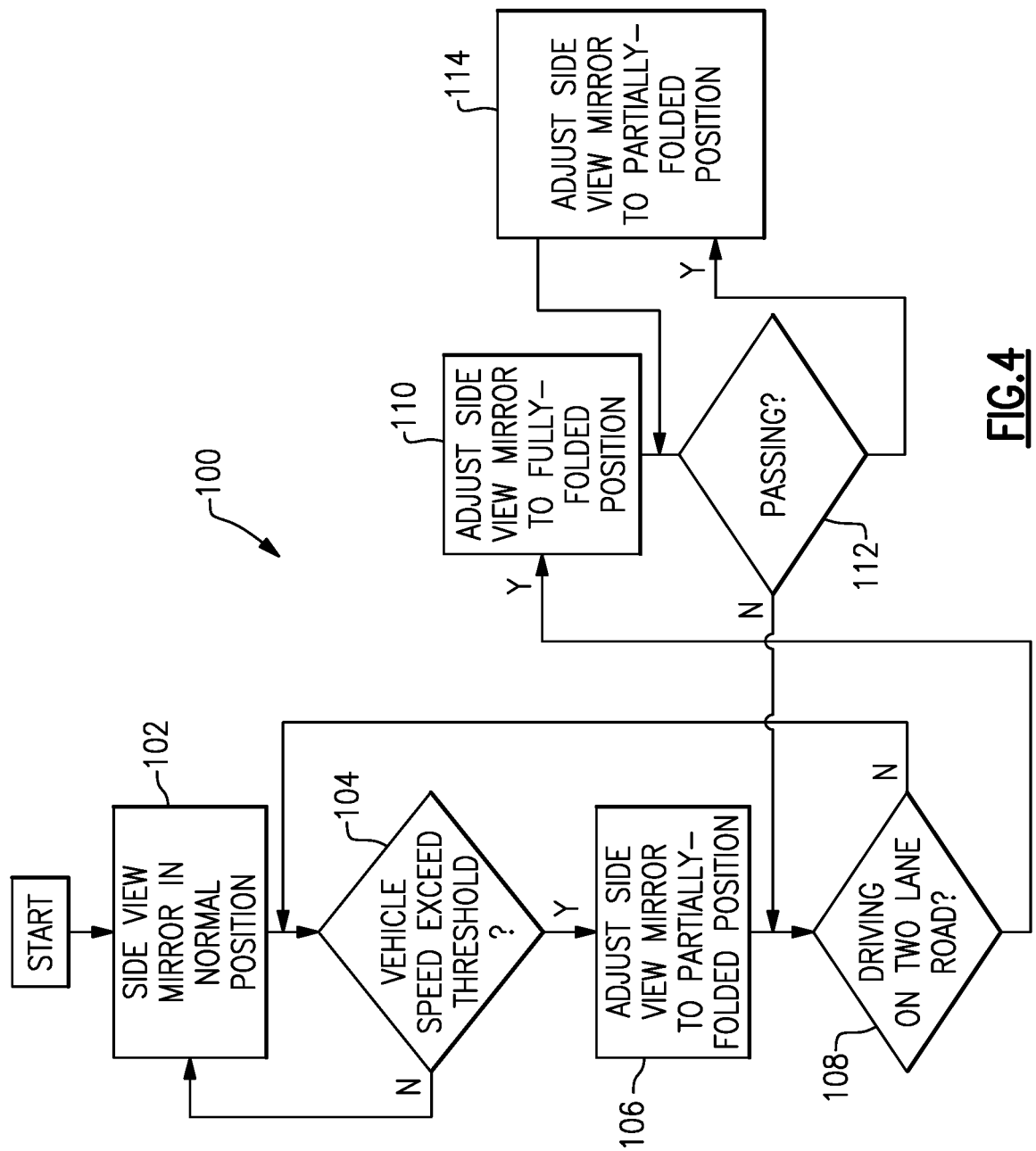

FOLDABLE SIDE MIRROR AND METHOD OF USING THE SAME

TECHNICAL FIELD

This disclosure relates to a motor vehicle having a foldable side mirror and an associated method.

BACKGROUND

Motor vehicles are known to include side mirrors, which are sometimes referred to as side view mirrors, wing mirrors, or outside rear-view mirrors. Side mirrors are attached to the exterior of the motor vehicle, on both the driver and passenger sides of the vehicle. The side mirrors help the driver see areas behind and to the sides of the vehicle. Side mirrors are known to include a mirror housing and a mirror supported within the mirror housing. The mirror is typically adjustable to provide a desired line of sight. Further, in some vehicles, the mirror housing folds against the vehicle exterior when the vehicle is parked to prevent damage that may be caused by closely passing vehicles, for example.

SUMMARY

A motor vehicle according to an exemplary aspect of the present disclosure includes, among other things, a side mirror assembly having a mirror housing and a mirror. The mirror housing is moveable between a normal position and a partially-folded position, and the mirror is moveable relative to the mirror housing such that a line of sight remains the same in the normal and partially-folded positions.

In a further non-limiting embodiment of the foregoing motor vehicle, the motor vehicle includes at least one motor configured to move at least one of the mirror housing and the mirror, and further includes a controller electrically coupled to the at least one motor. The controller is configured to provide instructions to the at least one motor to move at least one of the mirror housing and the mirror.

In a further non-limiting embodiment of any of the foregoing motor vehicles, the motor vehicle includes a first motor configured to move the mirror housing and a second motor configured to move the mirror. Each of the first and second motors are electrically coupled to the controller.

In a further non-limiting embodiment of any of the foregoing motor vehicles, the controller is configured to instruct the at least one motor to move the mirror housing to the partially-folded position when a speed of the motor vehicle exceeds a predetermined threshold speed.

In a further non-limiting embodiment of any of the foregoing motor vehicles, the predetermined threshold speed is 50 miles per hour (about 80.5 kilometers per hour).

In a further non-limiting embodiment of any of the foregoing motor vehicles, an arm is configured to rotate the mirror housing relative to a body of the motor vehicle about a pivot.

In a further non-limiting embodiment of any of the foregoing motor vehicles, when moving the mirror housing from the normal position to the partially-folded position: the at least one motor rotates the mirror housing by a first amount in a first rotational direction, and the at least one motor rotates the mirror by a second amount substantially equal to the first amount in a second rotational direction opposite the first rotational direction.

In a further non-limiting embodiment of any of the foregoing motor vehicles, the second amount is equal to the first amount.

In a further non-limiting embodiment of any of the foregoing motor vehicles, the first amount is about 15 degrees.

In a further non-limiting embodiment of any of the foregoing motor vehicles, the side mirror assembly is on a passenger side of the motor vehicle, and the controller is configured to instruct the at least one motor to move the mirror housing to a fully-folded position when a speed of the motor vehicle exceeds a predetermined threshold speed.

In a further non-limiting embodiment of any of the foregoing motor vehicles, the controller is configured to instruct the at least one motor to move the mirror housing to a fully-folded position when the motor vehicle is driving along a two-lane road.

In a further non-limiting embodiment of any of the foregoing motor vehicles, the controller is configured to instruct the at least one motor to move the mirror from the fully-folded position to one of the normal position or the partially-folded position while the motor vehicle is a passing another motor vehicle.

A method according to an exemplary aspect of the present disclosure includes, among other things, moving a mirror housing of a side mirror assembly from a normal position to a partially-folded position, and moving a mirror relative to the mirror housing in response to movement of the mirror housing to maintain to constant line of sight.

In a further non-limiting embodiment of the foregoing method, the step of moving the mirror housing from the normal position to the partially-folded position is initiated when a speed of a motor vehicle exceeds a predetermined threshold speed.

In a further non-limiting embodiment of any of the foregoing methods, the predetermined threshold speed is 50 miles per hour (about 80.5 kilometers per hour).

In a further non-limiting embodiment of any of the foregoing methods, the step of moving the mirror housing from the normal position to the partially-folded position includes rotating the mirror housing by a first amount in a first rotational direction. Further, in response to movement of the mirror housing from the normal position to the partially-folded position, the mirror rotates by a second amount substantially equal to the first amount in a second rotational direction opposite the first rotational direction.

In a further non-limiting embodiment of any of the foregoing methods, the second amount is equal to the first amount.

In a further non-limiting embodiment of any of the foregoing methods, the method further includes moving the mirror housing to a fully-folded position when a speed of a motor vehicle exceeds a predetermined threshold speed.

In a further non-limiting embodiment of any of the foregoing methods, the mirror housing is moved to the fully-folded position when the motor vehicle is driving along a two-lane road.

In a further non-limiting embodiment of any of the foregoing methods, the method further includes moving the mirror from the fully-folded position to one of the normal position or the partially-folded position while the motor vehicle is a passing another motor vehicle.

BRIEF DESCRIPTION OF THE DRAWINGS

In FIG. 1, the motor vehicle is towing a trailer.

FIG. 4 is a flow chart representative of a method according to this disclosure.

DETAILED DESCRIPTION

This disclosure relates to a motor vehicle having a foldable side mirror and a method of using the same. In one particular embodiment, the motor vehicle includes a side mirror assembly having a mirror housing and a mirror. The mirror housing is moveable between a normal position and a partially-folded position, and the mirror is moveable relative to the mirror housing such that a line of sight remains the same in the normal and partially-folded positions. Partially-folding the side mirror improves fuel economy, and does so without changing the driver's line of sight and without requiring driver intervention.

Figure 1:
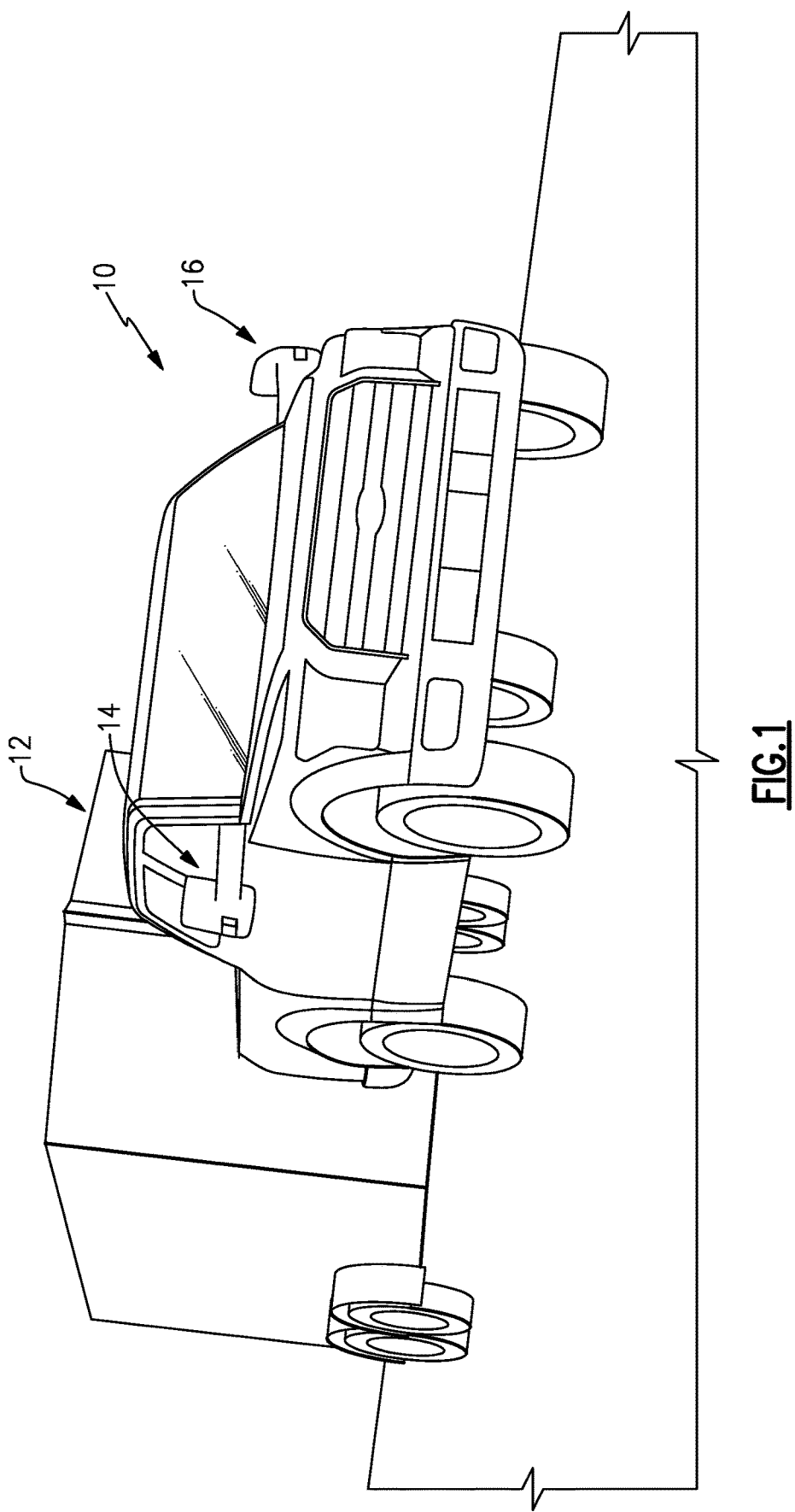
FIG. 1 is a front-perspective view of a motor vehicle, which in this example is a pickup truck.

Referring to the drawings, FIG. 1 is a front-perspective view of a motor vehicle 10, which in this example is a pickup truck. The vehicle 10 is pulling a trailer 12, in this example. The vehicle 10 includes first and second side mirror assemblies 14, 16 helping the driver see behind and to respective sides of the vehicle 10. It should be understood that the side mirror assemblies 14, 16 may also be referred to simply as "side mirrors." The first and second side mirror assemblies 14, 16 include multiple components, hence the term "assemblies," which provide side mirrors. Further, while the motor vehicle 10 in FIG. 1 is a pickup truck, it should be understood that this disclosure extends to other types of vehicles. That said, pickup trucks, and in particular those used for towing, are known to have relatively large side mirror assemblies. Since larger side mirror assemblies tend to create more wind drag, the benefits of this disclosure are pronounced in vehicles with relatively large side mirror assemblies.

Figure 2A:
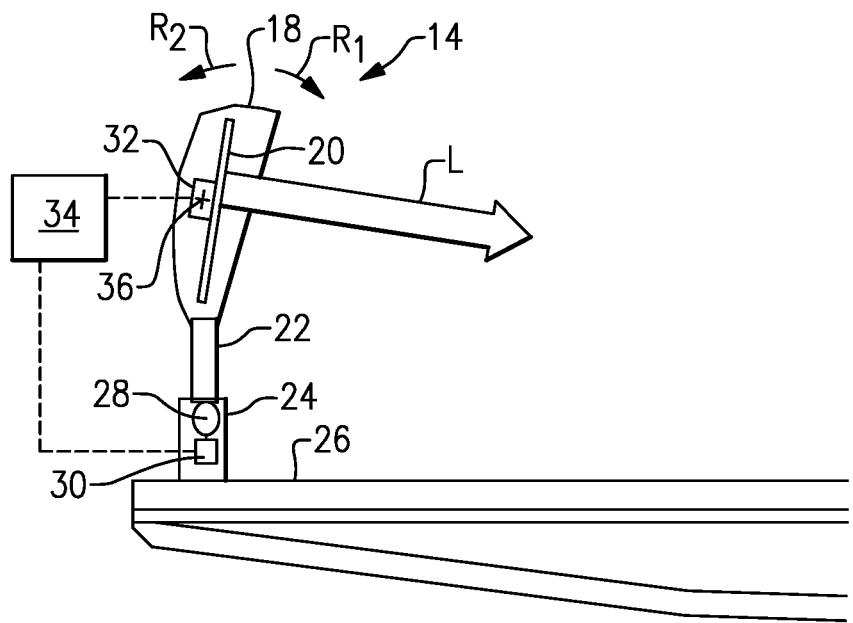
FIG. 2A is a top view of a side mirror assembly in a normal position.

FIG. 2A illustrates the detail of the first side mirror assembly 14. While not shown in FIG. 2A, it should be understood that the second side mirror assembly 16 would be arranged substantially similar to the first side mirror assembly 14. In this example, the first side mirror assembly 14 provides a passenger side mirror and the second side mirror assembly 16 provides a driver side mirror.

With reference to FIG. 2A, the first side mirror assembly 14 includes a mirror housing 18 and a mirror 20 mounted within the mirror housing 18. An arm 22 projects from the mirror housing 18. The arm 22 is pivotably connected to a mount 24, which is fixed to an exterior 26 of the vehicle 10. The mirror housing 18 and arm 22 are pivotable relative to the mount 24 about a pivot 28.

The first side mirror assembly 14 may include at least one motor configured to adjust the position of the mirror housing 18 (e.g., via adjustment of the arm 22) and the mirror 20. The mirror 20 is moveable independent of the mirror housing 18 to adjust a line of sight of the driver. In one example, one motor is configured to both pivot the mirror housing 18 about the pivot 28 and to adjust the position of the mirror 20. In another example, which is depicted in FIG. 2A, there is a first motor 30 configured to pivot the mirror housing 18 about the pivot 28 and a second motor 32 configured to adjust the mirror 20 relative to the mirror housing 18.

Specifically, the first motor 30 is configured to rotate the mirror housing 18 about the pivot 28 in a first rotational direction $R_1$ and a second rotational direction $R_2$ opposite the first rotational direction $R_1$. Further, the second motor 32 is configured to rotate the mirror 20 in the first and second rotational directions $R_1$, $R_2$ about a central axis 36, which extends in-and-out of the page relative to FIG. 2A. The central axis 36 is a central axis of the motor 32, and lies on a common plane with a line that bisects the mirror 20, in one example. When viewed from above, the first rotational direction $R_1$ is a clockwise direction, and the second rotational direction $R_2$ is a counter-clockwise direction. While motors 30, 32 are illustrated in the figures, it should be understood that the motors 30, 32 could represent an actuator of which the motors 30, 32 are a part. To this end, this disclosure is not limited to motors, and extends to other types of actuators that may not include a motor.

The motors 30, 32 are electrically coupled to a controller 34, and are responsive to instructions from the controller 34. It should be understood that the controller 34 could be part of an overall vehicle control module, such as a vehicle system controller (VSC), or could alternatively be a stand-alone controller separate from the VSC. Further, the controller 34 may be programmed with executable instructions for interfacing with and operating the various components of the vehicle 10. The controller 34 additionally includes a processing unit and non-transitory memory for executing the various control strategies and modes of the vehicle system. While the motors 30, 32 and controller 34 are shown separately, the controller 34 could be integrated into one or more of the motors 30, 32 in some examples. Further, it should be understood that the motors 30, 32 and the controller 34 are illustrated schematically in the figures.

In this disclosure, the side mirror assemblies 14, 16 are moveable between a normal position, a partially-folded position, and a fully-folded position. Example movements of the side mirror assembly 14 will now be discussed with joint reference to FIG. 2A (normal position), FIG. 2B (partially-folded position), FIG. 3 (fully-folded position), and FIG. 4, the latter of which is a flow chart representative of an example method 100 of this disclosure. The method is carried out by one or more of the components discussed above relative to FIGS. 1 and 2A.

The method 100 begins with the first side mirror assembly in the normal position, at 102. The normal position is represented in FIG. 2A, and corresponds to a normal position for a side mirror during operation of a vehicle. Most side mirrors are intended to remain in a normal position throughout all uses, save for a breakaway feature that is only intended to prevent damage in the event of an applied force. In FIG. 2A, the arm 22 extends substantially perpendicular to the exterior 26 of the vehicle 10 in the normal position. The mirror 20 is adjusted by the driver to set a desired line of sight L, which allows the driver to see behind and to the passenger side of the vehicle.

While the normal position provides a good line of sight L for the driver, the first side mirror assembly 14, and in particular the mirror housing 18, may create a relatively large amount of wind drag, especially at high vehicle speeds. Thus, at 104, the controller 34 determines whether the vehicle 10 is traveling at a speed that exceeds a predetermined threshold speed, and if so, instructs the motors 30 and/or 32 to adjust the first side mirror assembly 14 to the partially-folded position, at 106. In one example, the predetermined threshold is 50 miles per hour (about 80.5 kilometers per hour). This disclosure extends to other predetermined threshold speeds, however.

Figure 2B:
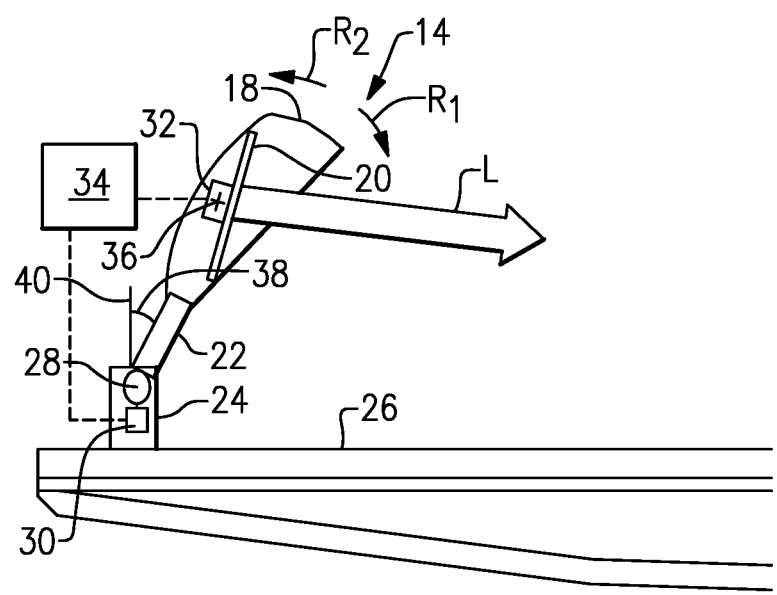
FIG. 2B is a top view of a side mirror assembly in a partially-folded position.

FIG. 2B illustrates the first side mirror assembly 14 in a partially-folded position. In FIG. 2B, the mirror housing 18 has rotated about the pivot 28 in the direction $R_1$, and the mirror 20 has rotated about the central axis 36 in the direction $R_2$. The rotation of the mirror housing 18 in the direction $R_1$ makes the first side mirror assembly 14 more aerodynamic, and thus reduces the effect of wind drag. Rotation of the mirror 20 in the direction $R_2$ maintains the line of sight L for the driver relative to the normal position. That is, the line of sight L remains the same, or substantially the same, when moving from the normal position (FIG. 2A) to the partially-folded position (FIG. 2B). For purposes of this disclosure, it is assumed that the perspective of the driver remains constant, and thus movements of the head of the driver, for example, do not affect the line of sight L. Further, it should be understood that the rotation of the mirror 20 may occur simultaneous with the rotation of the mirror housing 18, or alternatively the two rotational movements may occur sequentially.

The controller 34 may be programmed to automatically move the first side mirror assembly 14 to the partially-folded position when the vehicle 10 exceeds the predetermined speed threshold. Thus, this disclosure automatically reduces wind drag at relatively high vehicle speeds, without requiring driver input, and without disrupting the driver's line of sight L. To this end, the controller 34 is also programmed to move the first side mirror assembly 14 back to the normal position as the vehicle speed falls below the predetermined speed threshold.

In FIG. 2B, the motor 30 has rotated the mirror housing 18 by a first amount in the direction $R_1$ relative to the normal position, and the motor 32 has rotated the mirror 20 by a second amount in the direction $R_2$ relative to the normal position. The first and second amounts are substantially equal in one example. In a further example, the first and second amounts are equal. In one particular example, the mirror housing 18 rotated such that the arm 22 is inclined at an angle 38 of 15° relative to a line 40 perpendicular to the exterior 26, which represents a position of the arm 22 in the normal position. In this example, the mirror 20 is adjusted about 15° in the direction $R_2$ to maintain the line of sight L relative to the normal position. This disclosure is not limited to an adjustment of 15°, however, and extends to other angles. In another example, the angle 38 is less than 45°. In a further example, the angle 38 is less than 30°.

The controller 34 is configured to instruct the first side mirror assembly 14 to maintain the partially-folded position when the vehicle speed exceeds the predetermined speed threshold. Maintaining the partially-folded position for extended periods provides significant fuel savings. The partially-folded position, such as that of FIG. 2B, provides a balance between mitigating the effects of wind drag while still providing a fully-functioning side mirror. In some conditions, however, side mirror functionality is not required or desired, and thus the side mirror may be moved to a fully-folded position, which further mitigates the effects of wind drag.

Figure 3:
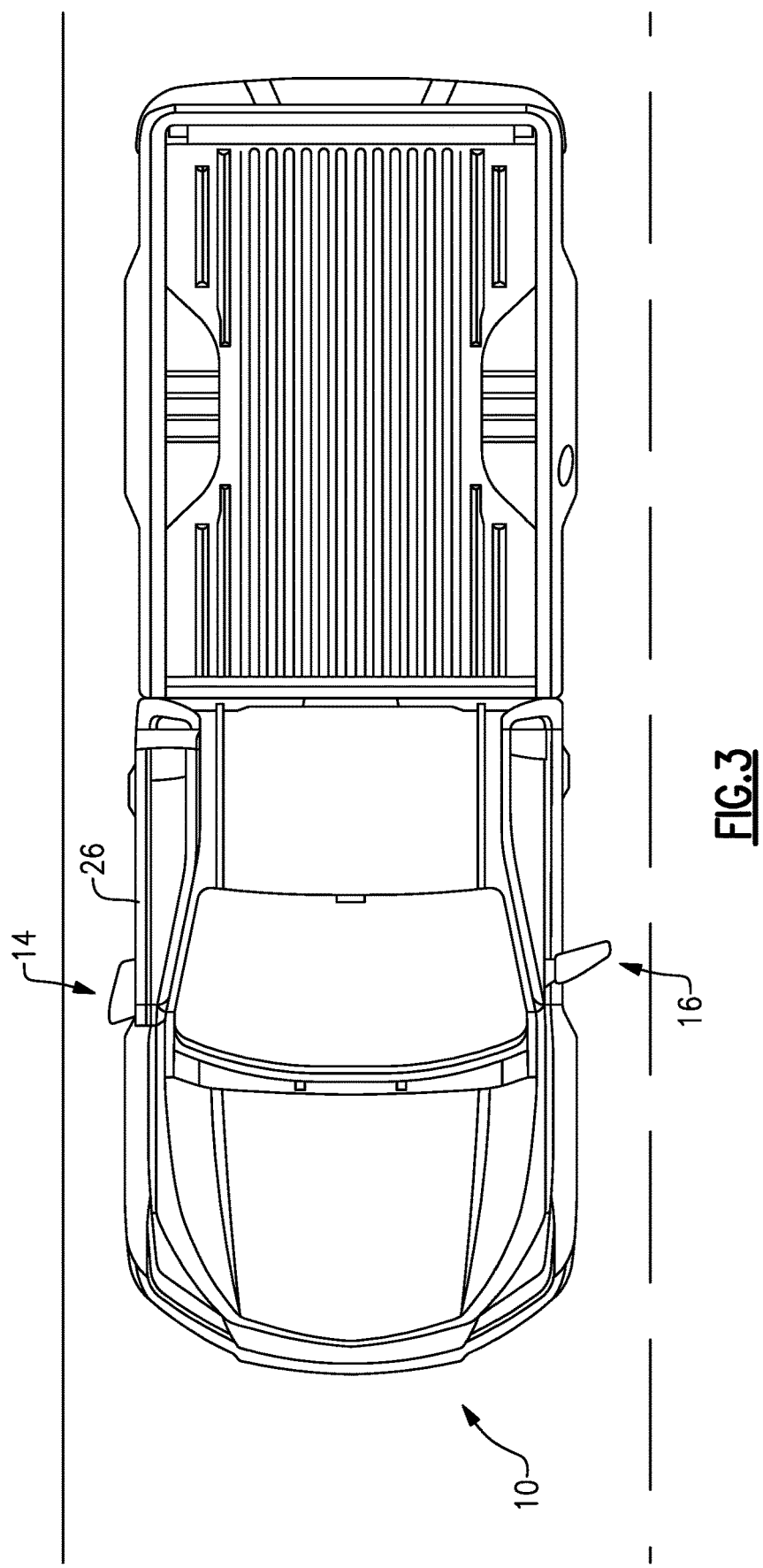
FIG. 3 is a top view of a motor vehicle traveling on a two lane road, with the passenger side mirror in a fully-folded position.

FIG. 3 is a top view of the motor vehicle 10 traveling on a two lane road, and illustrates the first side mirror assembly 14 in a fully-folded position, in which the mirror housing 18 is folded against, or substantially against, the exterior 26 of the vehicle. With reference to the angle 38 in FIG. 2B, the angle 38 would be about 90° in FIG. 3. The fully-folded position is defined, in this disclosure, as any position wherein the first side mirror assembly 14 cannot provide a line of sight for the driver behind and to the side of the vehicle.

In one example of use, the first side mirror assembly 14 is folded to the fully-folded position when driving on a two lane road. On a two lane road, the passenger side mirror is typically infrequently used, and in most cases is not used at all. At 108, the controller 34 determines whether the vehicle 10 is driving on a two lane road. The controller 34 may make this determination upon receipt of information from a GPS unit or a maps application regarding road type. If the vehicle 10 is traveling on a two lane road and traveling above the predetermined threshold speed, then, at 110, the controller 34 instructs the motor 30 to rotate the mirror housing 18 to the fully-folded position of FIG. 3.

Even on a two lane road, the first side mirror assembly 14 may be required during a passing operation, in which the vehicle 10 overtakes a slower-moving vehicle. Thus, at 112, the controller 34 determines whether the vehicle 10 is performing a passing operation, and, if the vehicle 10 is passing at a speed above the predetermined threshold speed, adjusts the first side mirror assembly 14 to the partially-folded position, at 114, to provide the driver with a line of sight L during the passing operation. The first side mirror assembly 14 may be moved to the normal position, at 114, if passing at a speed below the predetermined threshold speed. When the passing operation is complete, the first side mirror assembly 14 returns to the fully-folded position, and the method 100 continues.

As noted above, this disclosure may be particularly useful in towing applications where side mirrors are known to be relatively large. It should be understood that other vehicle types would benefit from this disclosure. In fact, many vehicles already include most, if not all, of the hardware required for this disclosure. That is, many vehicles include an adjustable mirror disposed within a vehicle housing, and many vehicles include automatically foldable side mirrors, such as those that automatically move to a fully-folded position when parked, for example. Those vehicles would benefit from the significant fuel savings afforded by this disclosure without requiring a significant hardware investment.

Although a specific component relationship is illustrated in the figures of this disclosure, the illustrations are not intended to limit this disclosure. In other words, the placement and orientation of the various components of the vehicle 10 are shown schematically and could vary within the scope of this disclosure. In addition, the various figures accompanying this disclosure are not necessarily to scale, and some features may be exaggerated or minimized to show certain details of a particular component or arrangement.

It should be understood that terms such as "about," "substantially," and "generally" are not intended to be boundaryless terms, and should be interpreted consistent with the way one skilled in the art would interpret those terms. Further, directional terms such as "behind," "side," and "exterior" are used with reference to a normal operational attitude of a motor vehicle, and are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
   a side mirror assembly including a mirror housing and a mirror, the mirror housing moveable between a normal position and a partially-folded position, the mirror moveable relative to the mirror housing such that a line of sight remains the same in the normal and partially-folded positions;
   a first motor configured to move the mirror housing;
   a second motor configured to move the mirror; and
   a controller electrically coupled to both of the first and second motors, and configured to provide instructions to the first and second motors so that the mirror and mirror housing are automatically and simultaneously moveable relative to one another such that the line of sight remains the same without requiring driver intervention.

2. The motor vehicle as recited in claim 1, wherein the controller is configured to instruct the first motor to move the mirror housing to the partially-folded position when a speed of the motor vehicle exceeds a predetermined threshold speed.

3. The motor vehicle as recited in claim 2, wherein the predetermined threshold speed is 50 miles per hour (about 80.5 kilometers per hour).

4. The motor vehicle as recited in claim 2, wherein an arm is configured to rotate the mirror housing relative to a body of the motor vehicle about a pivot.

5. The motor vehicle as recited in claim 2, wherein, when moving the mirror housing from the normal position to the partially-folded position:
   the first motor rotates the mirror housing by a first amount in a first rotational direction, and
   the second motor rotates the mirror by a second amount substantially equal to the first amount in a second rotational direction opposite the first rotational direction.

6. The motor vehicle as recited in claim 5, wherein the second amount is equal to the first amount.

7. The motor vehicle as recited in claim 5, wherein the first amount is about 15 degrees.

8. The motor vehicle as recited in claim 1, wherein:
   the side mirror assembly is on a passenger side of the motor vehicle, and
   the controller is configured to instruct the first motor to move the mirror housing to a fully-folded position when a speed of the motor vehicle exceeds a predetermined threshold speed.

9. A motor vehicle, comprising:
   a side mirror assembly including a mirror housing and a mirror, the mirror housing moveable between a normal position and a partially-folded position, the mirror moveable relative to the mirror housing such that a line of sight remains the same in the normal and partially-folded positions;
   at least one motor configured to move at least one of the mirror housing and the mirror;
   a controller electrically coupled to the at least one motor, and configured to provide instructions to the at least one motor to move at least one of the mirror housing and the mirror;
   wherein the side mirror assembly is on a passenger side of the motor vehicle,
   wherein the controller is configured to instruct the at least one motor to move the mirror housing to a fully-folded position when a speed of the motor vehicle exceeds a predetermined threshold speed, and
   wherein the controller is configured to instruct the at least one motor to move the mirror housing to a fully-folded position when the motor vehicle is driving along a two-lane road.

10. The motor vehicle as recited in claim 9, wherein the controller is configured to instruct the at least one motor to move the mirror from the fully-folded position to one of the normal position or the partially-folded position while the motor vehicle is a passing another motor vehicle.

11. A method, comprising:
    moving a mirror housing of a side mirror assembly from a normal position to a partially-folded position; and
    automatically moving a mirror relative to the mirror housing without requiring driver intervention and in response to and simultaneous with movement of the mirror housing to maintain a constant line of sight.

12. The method as recited in claim 11, wherein the step of moving the mirror housing from the normal position to the partially-folded position is initiated when a speed of a motor vehicle exceeds a predetermined threshold speed.

13. The method as recited in claim 12, wherein the predetermined threshold speed is 50 miles per hour (about 80.5 kilometers per hour).

14. The method as recited in claim 11, wherein:
    the step of moving the mirror housing from the normal position to the partially-folded position includes rotating the mirror housing by a first amount in a first rotational direction, and
    in response to movement of the mirror housing from the normal position to the partially-folded position, the mirror rotates by a second amount substantially equal to the first amount in a second rotational direction opposite the first rotational direction.

15. The method as recited in claim 14, wherein the second amount is equal to the first amount.

16. The method as recited in claim 11, further comprising:
    moving the mirror housing to a fully-folded position when a speed of a motor vehicle exceeds a predetermined threshold speed.

17. A method, comprising:
    moving a mirror housing of a side mirror assembly from a normal position to a partially-folded position;
    moving a mirror relative to the mirror housing in response to movement of the mirror housing to maintain a constant line of sight;
    moving the mirror housing to a fully-folded position when a speed of a motor vehicle exceeds a predetermined threshold speed and when the motor vehicle is driving along a two-lane road.

18. The method as recited in claim 17, further comprising:
    moving the mirror from the fully-folded position to one of the normal position or the partially-folded position while the motor vehicle is a passing another motor vehicle.

19. The method as recited in claim 11, wherein a first motor moves the mirror housing and a second motor moves the mirror.

* * * * *